IKUO MORI  3,549,241
EXTREMELY WIDE-ANGLE OBJECT LENS
Filed Oct. 15, 1968  5 Sheets-Sheet 1

—— LATERAL SPHERICAL ABERRATION
—·— COMA AT 35°
---- COMA AT 45°

COMA ABERRATION

FIG.1(C) SPHERICAL ABERRATION

FIG.1(D) ASTIGMATISM

FIG.1(E) DISTORTION

FIG.1(F) SHORT DISTANCE ASTIGMATISM $\beta = \frac{1}{25}$

FIG. 2(A)
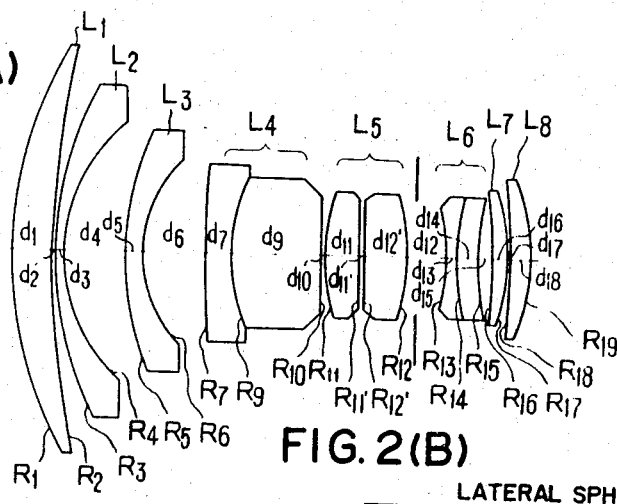
FIG. 2(B)
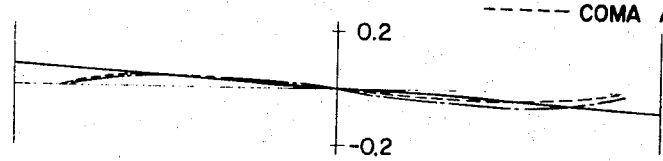
COMA ABERRATION
——— LATERAL SPHERICAL ABERRATION
—·—·— COMA AT 35°
— — — COMA AT 45°
FIG. 2(C)  FIG. 2(D)  FIG. 2(E)  FIG. 2(F)
SPHERICAL ABERRATION | ASTIGMATISM | DISTORTION | SHORT DISTANCE = 1/25 ASTIGMATISM PROVIDED d₁₁=1.57
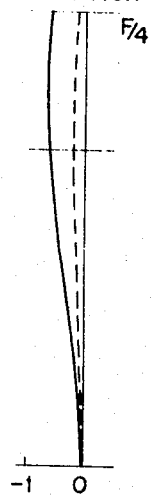
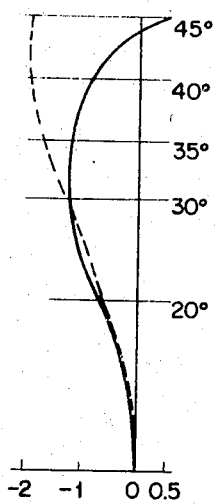
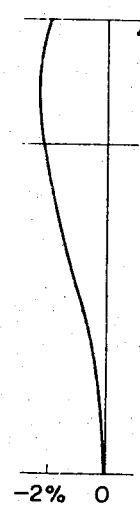

—— LATERAL SPHERICAL ABERRATION
—·— COMA AT 35°
---- COMA AT 47°

COMA ABERRATION

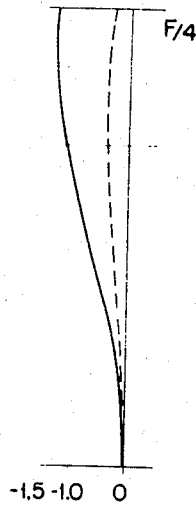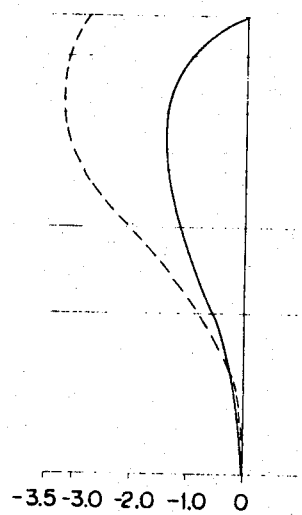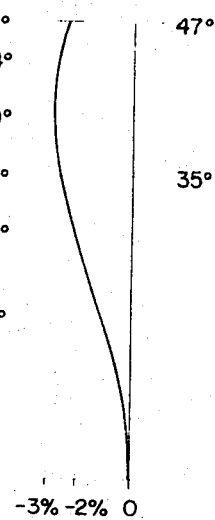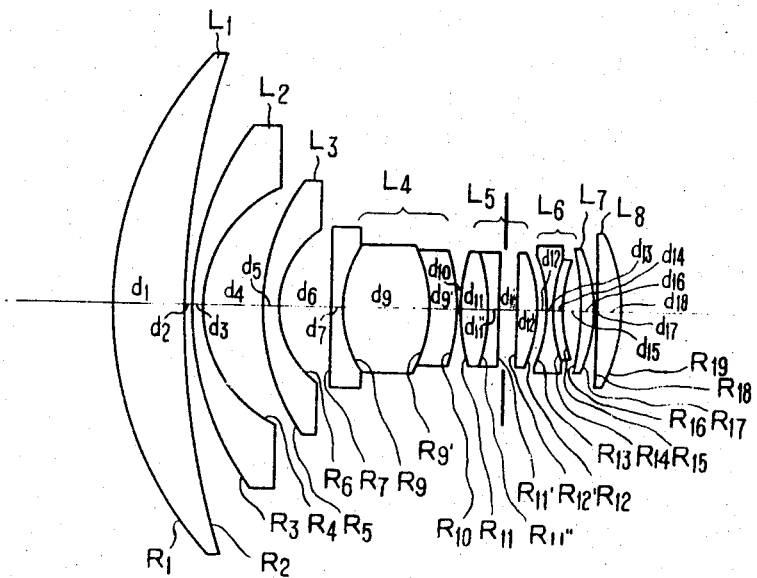

SPHERICAL ABERRATION

ASTIGMATISM

DISTORTION 3,549,241
EXTREMELY WIDE-ANGLE OBJECT LENS
Ikuo Mori, Kawasaki-shi, Japan, assignor to Nippon Kogaku K.K., Tokyo, Japan, a corporation of Japan
Filed Oct. 15, 1968, Ser. No. 767,683
Claims priority, application Japan, Oct. 24, 1967, 42/68,035
Int. Cl. G02b 9/64
U.S. Cl. 350—176  5 Claims

ABSTRACT OF THE DISCLOSURE

This invention relates to the extremely wide-angle object lens which can satisfy the conditions represented by the following formulae;

(I) $\quad\quad\quad 1.5 < R_2/R_3 < 4.0$ (II) $\quad\quad\quad d_{13} + d_{14} > d_{15}$ (in the above given formulae, R stands for the radius of curvature of each lens, and d stands for air-space or the central thickness of each lens) in a retrofocussing type lens which comprises forming the front group dispersing system with the positive meniscus lens $L_1$ and the negative meniscus lenses $L_2$ and $L_3$ whose convex surfaces are respectively directed towards the direction in which light rays are projected, arranging the positive lenses $L_4$ and $L_5$ which are respectively cemented or divided, and providing the negative lens $L_6$ and the positive meniscus lenses $L_7$ and $L_8$ to form the rear lens group.

---

This invention relates to a compact retrofocus type extremely wide-angle lens having the aperture ratio of F/4 and the angle of view from 90° to 100°, and can be used as a camera lens not only for 35 mm. single lens reflex camera, but also for a large single lens reflex camera of 6 x 7 cm. type.

Generally speaking, in a wide angle lens of short focal length, distortion is easily brought about by a great deal because it is necessary to retain back focus above a predetermined length. In order to correct the distortion it has been propored that one positive lens of high refractive power be added to the dispersing system or a positive meniscus lens of high refractive power used at the top of the system. However, in these conventional correction systems the effective diameter of the first lens is of necessity, quite large. Therefore, when it is used as the camera lens of a 35 mm. camera the size is immaterial, but in a large camera of the 6 x 7 cm. type, various kinds of inconveniences are brought about in actual photography.

On the other hand, as a drawback accompanying the minimization of the system, the deterioration of coma and astigmatism can be accounted.

The principal object of this invention is to overcome said defects by satisfying the conditions represented by the Formulae I and II explained hereinafter and by structuring the front group dispersing system with one positive meniscus lens and two negative meniscus lenses, and using such front group dispersing system along with five rear group lenses.

In accordance with this invention, it is possible to obtain a retrofocus type extremely wide angle lens having the aperture ratio of F/4 and angle of view ranging from 90° to 100°, which can retain back focus above a predetermined value to satisfy the respective objects and wherein the effective diameter of the first lens is made remarkably small, and the aberrations are excellently corrected.

The present invention is described in detail referring to the embodiments shown in the accompanying drawing, in which:

FIG. 2 shows a lens of Embodiment II, and A shows the cross section thereof, B shows the coma, C shows the spherical aberration, D shows the astigmatism, E shows the disortion, and F shows the astigmatism at a short distance and the magnification $\beta$ of 1/25 wherein $d_{11}$, is changed to be 1.57;

Figure 1A:
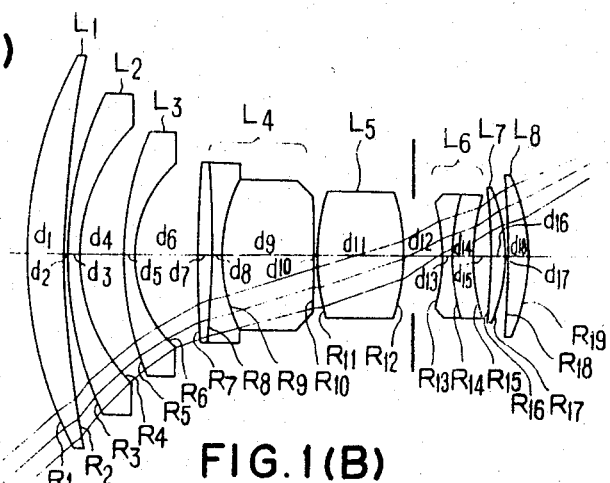
FIG. 1 shows an embodiment of a lens of a large single lens reflex camera of 6 x 6 cm. or 6 x 7 cm. type, and A shows the cross sectional view of the lens of the Embodiment I, B shows coma, C shows the spherical aberration, D shows the astigmatism, E shows the distorsion, and F shows the astigmastism at short distance of magnification $\beta = 1/25$.
Figure 1B:
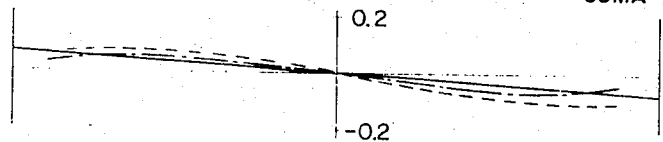
Figure 1B:
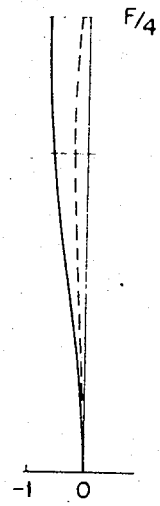
Figure 1B:
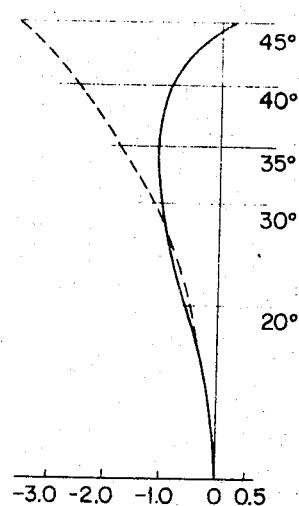
Figure 1B:
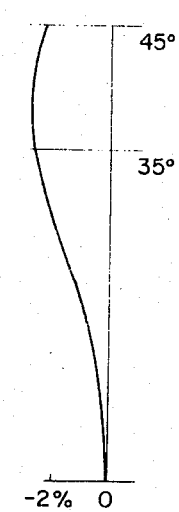
Figure 1B:
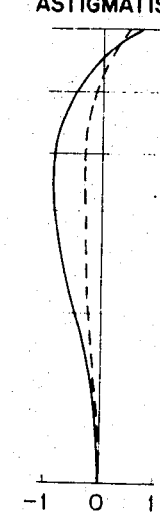
Figure 3A:
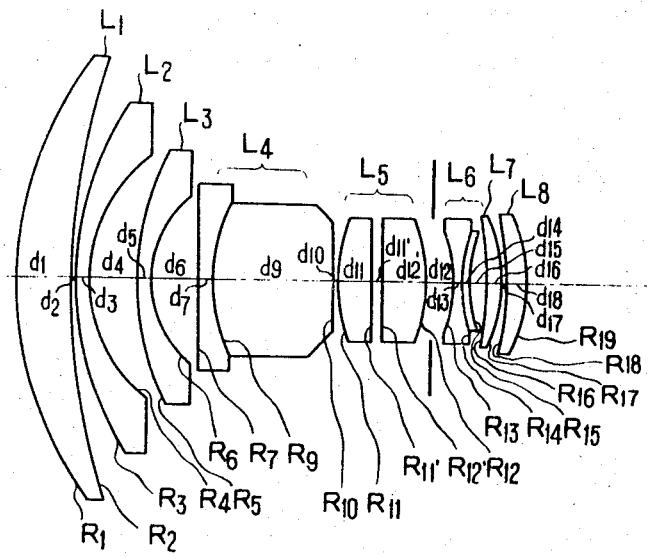
Figure 3B:
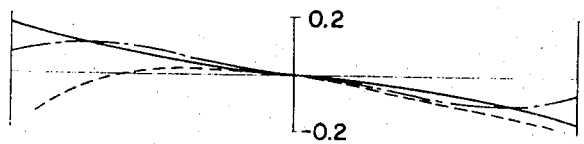
Figure 4B:
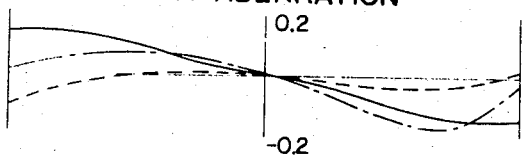
Figure 4C:
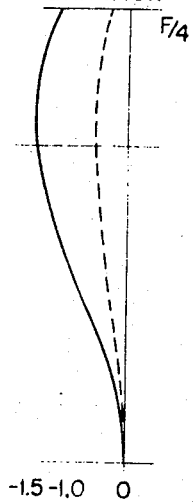
Figure 4D:
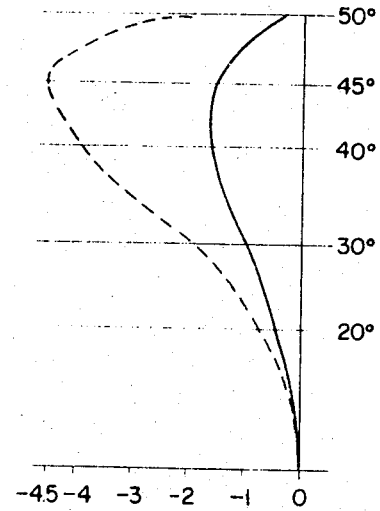
Figure 4E:
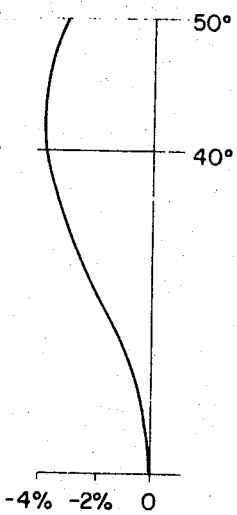
Figure 5:
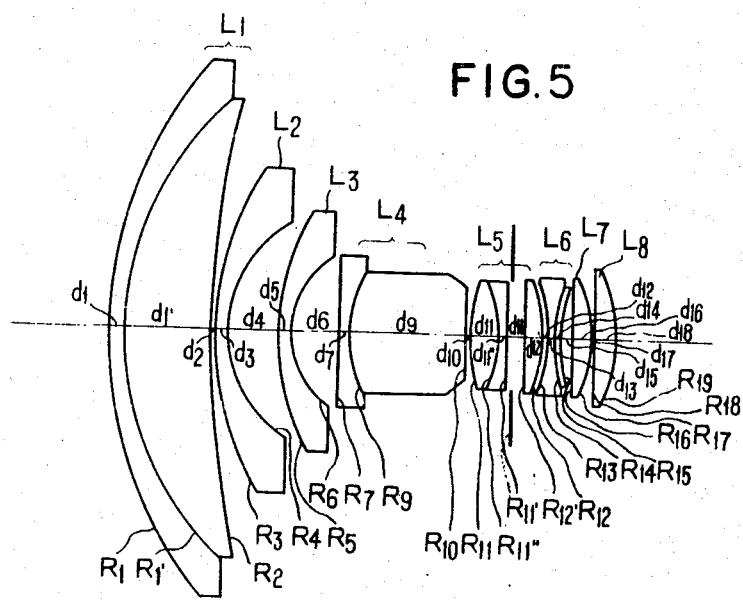

FIG. 3 through FIG. 5 show 35 mm. single lens reflex camera lenses, and FIG. 3A shows the cross sectional view of the lens of Embodiment III, B shows the coma, C shows the spherical aberration, D shows the astigmatism, and E shows the distortion; FIG. 4A shows the cross section of Embodiment IV, B through E show respective aberrations in the same way; and FIG. 5 shows the cross sectional view of the lens of Embodiment V.

This invention is explained according to Embodiment I shown in FIG. 1, and in this Embodiment I, the top lens $L_1$ is a positive meniscus lens, $L_2$ and $L_3$ are negative meniscus lenses, respectively, $L_4$ and $L_5$ are the positive lenses respectively, $L_6$ is a negative lens, and $L_7$ and $L_8$ are positive meniscus lenses, respectively, and the following conditions can be satisfied.

(I) $\quad\quad\quad 1.5 < R_2/R_3 < 4.0$ (II) $\quad\quad\quad d_{13} + d_{14} > d_{15}$ A wide angle lens wherein a positive meniscus lens is provided on the top as in this embodiment has already been known. However, the drawback of the conventional lens is that since the difference of the curvature of the first surface of the positive meniscus lens and the first surface of the negative meniscus lens provided right behind the positive meniscus lens, is large for correcting the distortion, the air space at the periphery of the lenses becomes extremely great when compared with the air space on the axis, and the aslant light flux of the peripheral portion coming out of the first lens is greatly refracted upwards and enters into the second lens. Therefore, when the difference of the curvature is greater, the above mentioned effect becomes greater, as the result that the position of the stop is moved forward, and in order to return the stop to the predetermined position, the position of the aslant light ray having entered the first lens must be lowered. Therefore, the effective diameter of the firts lens is necessitated to be greater.

In accordance with this invention, in order to solve this problem, relatively larger curvatures are given to $R_1$ and $R_2$, respectively, in comparison to the composite focal length so as to make the first lens into the state of meniscus of larger curvature, and relatively smaller curvature than that of $R_2$ is given to $R_3$, i.e., condition I given above, and the air space at the pheripheral portion of the lenses does not become greater than the air space on the axis, and thereby the forward movement of the diaphragm can be prevented, and it is possible to obtain minimized lens as a whole.

It is preferable to give relatively larger curvature such as $0.8 < R_1/R_2 < 1.2$ to the curvature of $R_1$ in view of the correction of the distortion.

The above given condition II is helpful for removing the astigmatism in the negative direction on the meridional surface of the intermediate portion of the view as is generated when a lens is minimized, and it is effective to minimize $d_{15}$ simultaneously in order to correct the astigmatism in the positive direction on the sagittal surface of the peripheral portion. On the other hand, since the dispersing effect at the front group is relatively strong, the coma aberration at the lower portion of the aslant light flux (the light passing through the portion lower than the position of the stop) is apt to be generated in the negative direction, but in order to correct the coma, the curvature of the lens $L_5$ is preferably given as $|R_{12}| < R_{11}$. When it goes beyond the upper limit of the condition I among the conditions I and II, distortion can be further corrected, but when the back focus, i.e. B.f., becomes shorter, the lens becomes larger which is accounted to be the drawback. When it goes beyond the lower limit, the deterioration of distortion is brought about, and this is not practical, and when it goes beyond the range of the condition II, the astigmatism is deteriorated, and the astigmatism remains greatly on the meridional surface at the intermediate portion of the image field, and such a wide angle lens as that of this invention cannot be obtained.

In the following tables of respective embodiments and the drawings, L stands for each lens member, R stands for the radius of curvature of each lens, and $d$ is the central thickness of each lens or the air space, and $n$ is the refractive index to the line $d$, and $v$ is Abbe's number.

FIG. 1 shows the lens of Embodiment I of this invention, and shows the extremely wide angle lens having the aperture ratio of $F/4$ and the angle of view of 90°.

EMBODIMENT I $f=100$ F/4 90°

| | | | |
|---|---|---|---|
| $R_1 = 159.5$ | $d_1 = 14.0$ | $n_1 = 1.62041$ | $v_1 = 60.3$ |
| $R_2 = 379.3$ | $d_2 = 0.2$ | | |
| $R_3 = 135.78$ | $d_3 = 4.3$ | $n_2 = 1.6968$ | $v_2 = 55.6$ |
| $R_4 = 65.73$ | $d_4 = 17.25$ | | |
| $R_5 = 120.69$ | $d_5 = 4.3$ | $n_3 = 1.6968$ | $v_3 = 55.6$ |
| $R_6 = 45.69$ | $d_6 = 23.71$ | | |
| $R_7 = 754.32$ | $d_7 = 5.4$ | $n_4 = 1.62045$ | $v_4 = 38.0$ |
| $R_8 = -409.5$ | $d_8 = 3.2$ | $n_5 = 1.62041$ | $v_5 = 60.3$ |
| $R_9 = 60.5$ | $d_9 = 36.64$ | $n_6 = 1.53172$ | $v_6 = 48.9$ |
| $R_{10} = -280.18$ | $d_{10} = 0.2$ | | |
| $R_{11} = 112.07$ | $d_{11} = 32.76$ | $n_7 = 1.60342$ | $v_7 = 38.0$ |
| $R_{12} = -95.26$ | $d_{12} = 15.09$ | | |
| $R_{13} = -70.04$ | $d_{13} = 4.53$ | $n_8 = 1.76182$ | $v_8 = 26.5$ |
| $R_{14} = 86.21$ | $d_{14} = 8.62$ | $n_9 = 1.76684$ | $v_9 = 46.2$ |
| $R_{15} = 174.57$ | $d_{15} = 5.17$ | | |
| $R_{16} = -288.8$ | $d_{16} = 5.39$ | $n_{10} = 1.51835$ | $v_{10} = 60.3$ |
| $R_{17} = -65.3$ | $d_{17} = 0.2$ | | |
| $R_{18} = -926.74$ | $d_{18} = 8.4$ | $n_{11} = 1.6393$ | $v_{11} = 45.0$ |
| $R_{19} = -67.57$ | | | |

B.f. = 173.0

The following is an explanation about the lens of Embodiment II of this invention as is shown in FIG. 2, and this shows the extremely wide angle lens having such an efficiency as the aperture ratio of $F/4$ and the angle of view of 90°.

EMBODIMENT II

[wherein $R_8$, $d_8$ and $n_5$, $v_5$ are missing $R_{11'}$, $R_{12'}$, $d_{11'}$, $d_{12'}$, $n_{7'}$ and $v_{7'}$ are added]

| | | | |
|---|---|---|---|
| $R_1 = 159.5$ | $d_1 = 15.09$ | $n_1 = 1.62041$ | $v_1 = 60.3$ |
| $R_2 = 360.74$ | $d_2 = 0.2$ | | |
| $R_3 = 135.78$ | | | |
| $R_4 = 65.73$ | $d_3 = 4.31$ | $n_2 = 1.6968$ | $v_2 = 55.6$ |
| | $d_4 = 21.55$ | | |
| $R_5 = 120.69$ | $d_5 = 5.39$ | $n_3 = 1.6968$ | $v_3$ 55.6 |
| $R_6 = 45.69$ | $d_6$ 23.71 | | |
| $R_7 = 823.29$ | $d_7 = 8.62$ | $n_4 = 1.6779$ | $v_4 = 55.5$ |
| $R_9 = 60.35$ | $d_9 = 35.56$ | $n_5 = 1.60562$ | $v_5 = 43.9$ |
| $R_{10} = -320.05$ | $d_{10} = 0.2$ | | |
| $R_{11} = 111.0$ | $d_{11}$ 12.93 | $n_7 = 1.60342$ | $v_7 = 38.0$ |
| $R_{11'} = \infty$ | $d_{11'} = 2.16$ | | |
| $R_{12'} = \infty$ | $d_{12'} = 15.74$ | $n_{7'} = 1.60342$ | $v_{7'} = 38.0$ |
| $R_{12} = -95.48$ | $d_{12} = 14.87$ | | |
| $R_{13} = -70.48$ | $d_{13} = 4.53$ | $n_8 = 1.76182$ | $v_8 = 26.5$ |
| $R_{14} = 86.2$ | $d_{14} = 8.62$ | $n_9 = 1.76684$ | $v_9 = 46.2$ |
| $R_{15} = 172.42$ | $d_{15} = 5.17$ | | |
| $R_{16} = -288.8$ | $d_{16} = 5.39$ | $n_{10} = 1.5168$ | $v_{10} = 64.2$ |
| $R_{17} = -65.52$ | $d_{17} = 0.2$ | | |
| $R_{18} = -926.74$ | $d_{18} = 8.41$ | $n_{11} = 1.6393$ | $v_{11} = 45.0$ |
| $R_{19} = -76.11$ | | | |

B.f. = 170.5

Generally speaking, when the conventional retrofocus type wide angle lens is focussed at a short distance, the generation of astigmatism is greatly moved to the positive direction, and coma is also deteriorated along with the astigmatism. In order to solve this problem, the fifth lens $L_5$ is divided into two, and when the air space between the two divided lenses is shortened in relation to the distance as in focussing, the astigmatism and coma can be turned back to the aberrations almost at the case of infinite distance. This is shown in the aberration curves of FIGS. 2(D) and 2(F). The lens $L_5$ does not give any bad effect to spherical aberration, chromatic aberration, or distortion even if the air space should be changed because light passes substantially parallelly through the lens $L_5$.

The Seidel's aberration coefficients of the respective refracted surfaces of the Embodiment II are as follows.

In the following table, I is the spherical aberration, II is the coma aberration, III is curvature of meridional image, IV is the curvature of sagittal image, and V stands for distortion.

SEIDEL'S ABERRATION COEFFICIENT IN EMBODIMENT II

| | I | II | III | IV | V |
|---|---|---|---|---|---|
| $J_1$ | 0.058 | 0.050 | 0.354 | 0.278 | 0.225 |
| $J_2$ | 0.001 | 0.004 | 0.114 | −0.033 | −0.750 |
| $J_3$ | 0.006 | 0.009 | 0.339 | 0.315 | 0.453 |
| $J_4$ | −1.405 | 0.070 | −0.635 | −0.628 | 0.029 |
| $J_5$ | 0.487 | 0.222 | 0.642 | 0.441 | 0.201 |
| $J_6$ | −15.337 | 1.665 | −1.435 | −1.077 | 0.116 |
| $J_7$ | 2.025 | 0.702 | 0.774 | 0.291 | 0.100 |
| $J_9$ | −3.138 | 0.110 | −0.056 | −0.048 | 0.002 |
| $J_{10}$ | −0.165 | −0.205 | −0.647 | −0.137 | −0.170 |
| $J_{11}$ | 9.090 | 1.515 | 1.087 | 0.588 | 0.097 |
| $J_{11'}$ | 0.000 | −0.004 | −0.093 | −0.031 | −0.223 |
| $J_{12'}$ | 0.000 | 0.004 | 0.093 | 0.031 | 0.223 |
| $J_{12}$ | 11.702 | −2.774 | 2.381 | 1.056 | −0.251 |
| $J_{13}$ | −16.843 | 2.802 | −2.012 | −1.080 | 0.180 |
| $J_{14}$ | 0.088 | −0.020 | 0.016 | 0.007 | 0.002 |
| $J_{15}$ | −9.003 | −3.290 | −3.872 | −1.458 | −0.534 |
| $J_{16}$ | 0.647 | 0.572 | 1.386 | 0.387 | 0.338 |
| $J_{17}$ | 3.394 | −0.502 | 0.749 | 0.590 | −0.090 |
| $J_{18}$ | 0.005 | 0.023 | 0.249 | 0.055 | 0.249 |
| $J_{19}$ | 20.782 | −1.001 | 0.658 | 0.561 | −0.027 |
| $\Sigma$ | 2.304 | −0.048 | 0.092 | 0.108 | 0.172 |

FIG. 3 is a lens of Embodiment III of this invention, and is an extremely wide angle lens for 35 mm. camera having the aperture ratio of F/4 and the angle of view of 94°.

EMBODIMENT III

[wherein $R_8$, $d_8$, $n_5$ and $v_5$ are missing; $R_{11}'$, $d_{11}'$, $R_{12}'$, $n_7'$ and $v_7'$ are added]

f=100 F/4 94°

| | | | |
|---|---|---|---|
| $R_1$=164.71 | $d_1$=24.50 | $n_1$=1.6516 | $v_1$=58.5 |
| $R_2$=398.04 | $d_2$=0.50 | | |
| $R_3$=149.51 | $d_3$=4.90 | $n_2$=1.6968 | $v_2$=55.6 |
| $R_4$=65.20 | $d_4$=19.61 | | |
| $R_5$=121.57 | $d_5$=4.90 | $n_3$=1.6968 | $v_3$=55.6 |
| $R_6$=44.12 | $d_6$=17.65 | | |
| $R_7$=849.51 | $d_7$=5.39 | $n_4$=1.713 | $v_4$=53.9 |
| $R_9$=58.82 | $d_9$=50.98 | $n_6$=1.54814 | $v_6$=45.9 |
| $R_{10}$=−195.10 | $d_{10}$=0.50 | | |
| $R_{11}$=121.08 | $d_{11}$=14.71 | $n_7$=1.62045 | $v_7$=38.0 |
| $R_{11}'$=∞ | $d_{11}'$=3.92 | | |
| $R_{12}'$=−24,500.00 | $d_{12}'$=18.63 | $n_7'$=1.62004 | $v_7'$=36.3 |
| $R_{12}$=92.40 | $d_{12}$=12.75 | | |
| $R_{13}$=−70.10 | $d_{13}$=3.92 | $n_8$=1.80518 | $v_8$=25.5 |
| $R_{14}$=102.94 | $d_{14}$=5.39 | $n_9$=1.80454 | $v_9$=39.5 |
| $R_{15}$=184.81 | $d_{15}$=2.45 | | |
| $R_{16}$=−289.22 | $d_{16}$=6.86 | $n_{10}$=1.58267 | $v_{10}$=46.5 |
| $R_{17}$=−68.14 | $d_{17}$=0.50 | | |
| $R_{18}$=−906.87 | $d_{18}$=9.80 | $n_{11}$=1.54072 | $v_{11}$=47.2 |
| $R_{19}$=−67.01 | | | |

B.f=184.35.

FIG. 4 is a lens of Embodiment IV of this invention, and is an extremely wide angle lens for 35 mm. camera having the aperture ratio of F/4 and the angle of view of 100°.

EMBODIMENT IV wherein $R_8$, $d_8$, $n_5$ and $v_5$ are missing; $R_9'$, $d_9'$, $R_{11}'$, $d_{11}'$, $R_{11}''$, $d_{11}''$, $R_{12}'$, $d_{12}'$, $n_6'$, $v_6'$, $n_7''$, $v_7''$, $n_7'$ and $v_7'$ are added]

f=100, F/4 100°

| | | | |
|---|---|---|---|
| $R_1$=177.60 | $d_1$=35.52 | $n_1$=1.6516 | $v_1$=58.5 |
| $R_2$=427.32 | $d_2$=0.55 | | |
| $R_3$=150.27 | $d_3$=4.37 | $n_2$=1.6516 | $v_2$=58.5 |
| $R_4$=64.48 | $d_4$=29.51 | | |
| $R_5$=121.31 | $d_5$=4.37 | $n_3$=1.6968 | $v_3$=55.6 |
| $R_6$=45.36 | $d_6$=24.59 | | |
| $R_7$=819.67 | $d_7$=5.47 | $n_4$=1.713 | $v_4$=53.9 |
| $R_9$=59.02 | $d_9$=40.98 | $n_6$=1.53172 | $v_6$=48.9 |
| $R_9'$=−81.97 | $d_9'$=13.66 | $n_6'$=1.53996 | $v_6'$=59.7 |
| $R_{10}$=−191.26 | $d_{10}$=0.55 | | |
| $R_{11}$=128.96 | $d_{11}$=12.57 | $n_7$=1.62004 | $v_7$=36.3 |
| $R_{11}''$=92.90 | $d_{11}''$=4.37 | $n_7''$=1.62041 | $v_7''$=60.3 |
| $R_{11}'$=∞ | $d_{11}'$=9.84 | | |
| $R_{12}'$=∞ | $d_{12}'$=8.20 | $n_7'$=1.62004 | $v_7'$=36.3 |
| $R_{12}$=−86.61 | $d_{12}$=4.37 | | |
| $R_{13}$=−70.49 | $d_{13}$=3.83 | $n_8$=1.80518 | $v_8$=25.5 |
| $R_{14}$=98.36 | $d_{14}$=5.47 | $n_9$=1.62004 | $v_9$=36.3 |
| $R_{15}$=250.27 | $d_{15}$=3.28 | | |
| $R_{16}$=−289.62 | $d_{16}$=7.10 | $n_{10}$=1.52682 | $v_{10}$=51.1 |
| $R_{17}$=−72.68 | $d_{17}$=0.55 | | |
| $R_{18}$=−928.96 | $d_{18}$=11.48 | $n_{11}$=1.53996 | $v_{11}$=59.7 |
| $R_{19}$=−67.98 | | | |

B.f=210.40.

FIG. 5 is a lens of Embodiment V of this invention, which is an improvement of the Embodiment IV, and shows the lens having been further removed of the chromatic aberration at the portion out of the axis by making the lens $L_1$ into a cemented lens.

EMBODIMENT V wherein $R_8$, $d_8$, $n_5$ and $v_5$ are missing; $R_1'$, $d_1'$, $R_{11}''$, $d_{11}''$, $R_{11}'$, $d_{11}'$, $R_{12}'$, $d_{12}'$, $n_1'$, $v_1'$, $n_7''$, $v_7''$, $n_7'$ and $v_7'$ are added f=100 F/4 100°

| | | | |
|---|---|---|---|
| $R_1$=204.35 | $d_1$=8.15 | $n_1$=1.7552 | $v_1$=27.5 |
| $R_1'$=152.17 | $d_1'$=43.48 | $n_1'$=1.6968 | $v_1'$=55.6 |
| $R_2$=456.52 | $d_2$=0.54 | | |
| $R_3$=149.46 | $d_3$=4.35 | $n_2$=1.6516 | $v_2$=58.5 |
| $R_4$=64.13 | $d_4$=27.17 | | |
| $R_5$=120.65 | $d_5$=4.35 | $n_3$=1.6968 | $v_3$=55.6 |
| $R_6$=45.65 | $d_6$=21.74 | | |
| $R_7$=896.74 | $d_7$=5.43 | $n_4$=1.74443 | $v_4$=49.4 |
| $R_9$=58.70 | $d_9$=58.15 | $n_6$=1.58065 | $v_6$=37.1 |
| $R_{10}$=−207.60 | $d_{10}$=0.54 | | |
| $R_{11}$=132.61 | $d_{11}$=12.5 | $n_7$=1.62004 | $v_7$=36.3 |
| $R_{11}''$=−65.2 | $d_{11}''$=4.35 | $n_7''$=1.62041 | $v_7''$=60.3 |
| $R_{11}'$=∞ | $d_{11}'$=9.78 | | |
| $R_{12}'$=∞ | $d_{12}'$=8.15 | $n_7'$=1.62004 | $v_7'$=36.3 |
| $R_{12}$=86.14 | $d_{12}$=2.17 | | |
| $R_{13}$=−70.11 | $d_{13}$=3.80 | $n_8$=1.80518 | $v_8$=25.5 |
| $R_{14}$=98.26 | $d_{14}$=5.43 | $n_9$=1.62041 | $v_9$=38.0 |
| $R_{15}$=248.91 | $d_{15}$=3.80 | | |
| $R_{16}$=−288.04 | $d_{16}$=8.15 | $n_{10}$=1.5168 | $v_{10}$=64.2 |
| $R_{17}$=−72.28 | $d_{17}$=0.54 | | |
| $R_{18}$=−978.26 | | $n_{11}$=1.56384 | $v_{11}$=60.8 |
| $R_{19}$=−69.79 | | | |

B.f=209.33

What is claimed is:
1. A wide angle objective lens of the retrofocus type comprising a front dispersive group consisting of a positive meniscus lens with its positive surface toward the object and two single negative meniscus lenses; a rear group consisting of two positive lens components, a negative lens component, and two single positive meniscus lenses; and having the following numerical data:

[Focal length=100; Aperture ratio F/4; Angle of view 90°]

| | | | |
|---|---|---|---|
| $R_1=159.5$ | $d_1=14.0$ | $n_d=1.62041$ | $v_1=60.3$ |
| $R_2=379.3$ | $d_2=0.2$ | | |
| $R_3=135.78$ | $d_3=4.3$ | $n_d=1.6968$ | $v_2=55.6$ |
| $R_4=65.73$ | $d_4=17.25$ | | |
| $R_5=120.69$ | $d_5=4.3$ | $n_d=1.6968$ | $v_3=55.6$ |
| $R_6=45.69$ | $d_6=23.71$ | | |
| $R_7=754.32$ | $d_7=5.4$ | $n_d=1.62045$ | $v_4=38.0$ |
| $R_8=-409.5$ | $d_8=3.2$ | $n_d=1.62041$ | $v_5=60.3$ |
| $R_9=60.5$ | $d_9=36.64$ | $n_d=1.53172$ | $v_6=48.9$ |
| $R_{10}=-280.18$ | $d_{10}=0.2$ | | |
| $R_{11}=112.07$ | $d_{11}=32.76$ | $n_d=1.60342$ | $v_7=38.0$ |
| $R_{12}=-95.26$ | $d_{12}=15.09$ | | |
| $R_{13}=-70.04$ | $d_{13}=4.53$ | $n_d=1.76182$ | $v_8=26.5$ |
| $R_{14}=86.21$ | $d_{14}=8.62$ | $n_d=1.76684$ | $v_9=46.2$ |
| $R_{15}=174.57$ | $d_{15}=5.17$ | | |
| $R_{16}=-288.8$ | $d_{16}=5.39$ | $n_d=1.51835$ | $v_{10}=60.3$ |
| $R_{17}=-65.3$ | $d_{17}=0.2$ | | |
| $R_{18}=0926.74$ | $d_{18}=8.4$ | $n_d=1.6393$ | $v_{11}=45.0$ |
| $R_{19}=-67.57$ | | | |

B.f=173.0 wherein $R_1$, $R_2$, $R_3$ . . . are the radii of the respective lenses, $d_1$, $d_2$, $d_3$ . . . are the lens thicknesses and air spaces between the respective lenses, $n_d$ the refractive indices of the respective lenses and $v_1$, $v_2$, $v_3$ . . . the Abbe numbers.

2. A wide angle objective lens of the retrofocus type, comprising a front dispersive group consisting of a positive meniscus lens with its positive surface toward the object and two single negative meniscus lenses; a rear group consisting of two positive lens components, a negative lens component and two single positive meniscus lenses; and having the following numerical data:

[Focal length=100; Aperture ratio F/4; Angle of view 90°]

| | | | |
|---|---|---|---|
| $R_1=159.5$ | $d_1=15.09$ | $n_1=1.62041$ | $v_1=60.3$ |
| $R_2=360.74$ | $d_2=0.2$ | | |
| $R_3=135.78$ | $d_3=4.31$ | $n_2=1.6968$ | $v_2=55.6$ |
| $R_4=65.73$ | $d_4=21.55$ | | |
| $R_5=120.69$ | $d_5=5.39$ | $n_3=1.6968$ | $v_3=55.6$ |
| $R_6=45.69$ | $d_6=23.71$ | | |
| $R_7=823.29$ | $d_7=8.62$ | $n_4=1.6779$ | $v_4=55.5$ |
| $R_9=60.35$ | $d_9=35.56$ | $n_6=1.60562$ | $v_6=43.9$ |
| $R_{10}=-320.05$ | $d_{10}=0.2$ | | |
| $R_{11}=111.0$ | $d_{11}=12.93$ | $n_7=1.60342$ | $v_7=38.0$ |
| $R_{11'}=\infty$ | $d_{11'}=2.16$ | | |
| $R_{12'}=\infty$ | $d_{12'}=15.74$ | $n_{7'}=1.60342$ | $v_{7'}=38.0$ |
| $R_{12}=-95.48$ | $d_{12}=14.87$ | | |
| $R_{13}=-70.48$ | $d_{13}=4.53$ | $n_8=1.76182$ | $v_8=26.5$ |
| $R_{14}=86.2$ | $d_{14}=8.62$ | $n_9=1.76684$ | $v_9=46.2$ |
| $_{15}=172.42$ | $d_{15}=5.17$ | | |
| $R_{16}=-288.8$ | $d_{16}=5.39$ | $n_{10}=1.5168$ | $v_{10}=64.2$ |
| $_{17}=-65.52$ | $d_{17}=0.2$ | | |
| $R_{18}=-926.74$ | $d_{18}=8.41$ | $n_{11}=1.6393$ | $v_{11}=45.0$ |
| $R_{19}=-76.11$ | | | | wherein $R_1$, $R_2$, $R_3$ . . . are the radii of the respective lenses, $d_1$, $d_2$, $d_3$ . . . are the lens thicknesses and air spaces between the respective lenses, $n$, $n_2$ $n_3$ . . . the refractive indices of the respective lenses and $v_1$, $v_2$, $v_3$ . . . the Abbe numbers.

3. A wide angle objective lens of the retrofocus type comprising a front dispersive group consisting of a positive meniscus lens with its positive surface toward the object and two single negative meniscus lenses; a rear group consisting of two positive lens components, a negative lens, component and two single positive meniscus lenses; and having the following numerical data:

[Focal length=100; Aperture ratio F/4; Angle of view 94°]

| | | | |
|---|---|---|---|
| $R_1=164.71$ | $d_1=24.50$ | $n_d=1.6516$ | $v_1=58.5$ |
| $R_2=398.04$ | $d_2=0.50$ | | |
| $R_3=149.51$ | $d_3=4.90$ | $n_d=1.6968$ | $v_2=55.6$ |
| $R_4=65.20$ | $d_4=19.61$ | | |
| $R_5=121.57$ | $d_5=4.90$ | $n_d=1.6968$ | $v_3=55.6$ |
| $R_6=44.12$ | $d_6=17.65$ | | |
| $R_7=849.51$ | $d_7=5.39$ | $n_d=1.713$ | $v_4=53.9$ |
| $R_9=58.82$ | $d_9=50.98$ | $n_d=1.54814$ | $v_6=45.9$ |
| $R_{10}=-195.10$ | $d_{10}=0.50$ | | |
| $R_{11}=121.08$ | $d_{11}=14.71$ | $n_d=1.62045$ | $v_7=38.0$ |
| $R_{11'}=\infty$ | $d_{11'}=3.92$ | | |
| $R_{12'}=-24500.00$ | $d_{12'}=18.63$ | $n_d=1.62004$ | $v_{7'}=36.3$ |
| $R_{12}=-92.40$ | $d_{12}=12.75$ | | |
| $R_{13}=-70.10$ | $d_{13}=3.92$ | $n_d=1.80518$ | $v_8=25.5$ |
| $R_{14}=102.94$ | $d_{14}=5.39$ | $n_d=1.80454$ | $v_9=39.5$ |
| $R_{15}=184.81$ | $d_{15}=2.45$ | | |
| $R_{16}=-289.22$ | $d_{16}=6.86$ | $n_d=1.58267$ | $v_{10}=46.5$ |
| $R_{17}=-68.14$ | $d_{17}=0.50$ | | |
| $R_{18}=-906.87$ | $d_{18}=9.80$ | $n_d=1.54072$ | $v_{11}=47.2$ |
| $R_{19}=-67.01$ | | | |

B.f=184.35 wherein $R_1$, $R_2$, $R_3$ . . . are the radii of the respective lenses, $d_1$, $d_2$, $d_3$ . . . are the lens thicknesses and air spaces between the respective lenses, $n_d$ the refractive indices of the respective lenses and $v_1$, $v_2$, $v_3$ . . . the Abbe numbers.

4. A wide angle objective lens of the retrofocus type, comprising a front dispersive group consisting of a positive meniscus lens with its positive surface toward the object and two single negative meniscus lenses; a rear group consisting of two positive lens components, a negative lens component, and two single positive meniscus lenses; and having the following numerical data:

[Focal length=100; Aperture ratio F/4; Angle of view 100°]

| | | | |
|---|---|---|---|
| $R_1=177.60$ | $d_1=35.52$ | $n_d=1.6516$ | $v_1=58.5$ |
| $R_2=427.32$ | $d_2=0.55$ | | |
| $R_3=150.27$ | $d_3=4.37$ | $n_d=1.6516$ | $v_2=58.5$ |
| $R_4=64.48$ | $d_4=29.51$ | | |
| $R_5=121.31$ | $d_5=4.37$ | $n_d=1.6968$ | $v_3=55.6$ |
| $R_6=45.36$ | $d_6=24.59$ | | |
| $R_7=819.67$ | $d_7=5.47$ | $n_d=1.713$ | $v_4=53.9$ |
| $R_9=59.02$ | $d_9=40.98$ | $n_d=1.53172$ | $v_6=48.9$ |
| $R_{9'}=-81.97$ | $d_{9'}=13.66$ | $n_d=1.53996$ | $v_{6'}=59.7$ |
| $R_{10}=-191.26$ | $d_{10}=0.55$ | | |
| $R_{11}=128.96$ | $d_{11}=12.57$ | $n_d=1.62004$ | $v_7=36.3$ |
| $R_{11''}=92.90$ | $d_{11''}=4.37$ | $n_d=1.62041$ | $v_{7''}=60.3$ |
| $R_{11'}=\infty$ | $d_{11'}=9.84$ | | |
| $R_{12'}=\infty$ | $d_{12'}=8.20$ | $n_d=1.62004$ | $v_{7'}=36.3$ |
| $R_{12}=-86.61$ | $d_{12}=4.37$ | | |
| $R_{13}=-70.49$ | $d_{13}=3.83$ | $n_d=1.80518$ | $v_8=25.5$ |
| $R_{14}=98.36$ | $d_{14}=5.47$ | $n_d=1.62004$ | $v_9=36.3$ |
| $R_{15}=250.27$ | $d_{15}=3.28$ | | |
| $R_{16}=289.62$ | $d_{16}=7.10$ | $n_d=1.52682$ | $v_{10}=51.1$ |
| $R_{17}=72.68$ | $d_{17}=0.55$ | | |
| $R_{18}=-928.96$ | $d_{18}=11.48$ | $n_d=1.53996$ | $v_{11}=59.7$ |
| $R_{19}=-67.98$ | | | |

B.f=210.40 wherein $R_1$, $R_2$, $R_3$ . . . are the radii of the respective lenses, $d_1$, $d_2$, $d_3$ . . . are the lens thicknesses and air spaces between the respective lenses, $n_d$ the refractive indices of the respective lenses and $v_1$, $v_2$, $v_3$ . . . the Abbe numbers.

5. A wide angle objective lens of the retrofocus type, comprising a front dispersive group consisting of a positive meniscus lens component with its positive surface toward the object nad two single negative meniscus lenses; a rear group consisting of two positive lens components, a negative lens component and two single positive meniscus lenses; and having the following numerical data:

[Focal length=100; Aperture ratio F/4; Angle of view 100°]

| | | | |
|---|---|---|---|
| $R_1=204.35$ | $d_1=8.15$ | $n_d=1.7552$ | $v_1=27.5$ |
| $R_{1'}=152.17$ | $d_{1'}=43.48$ | $n_d=1.6968$ | $v_{1'}=55.6$ |
| $R_2=456.52$ | $d_2=0.54$ | | |
| $R_3=149.46$ | $d_3=4.35$ | $n_d=1.6516$ | $v_2=58.5$ |
| $R_4=64.13$ | $d_4=27.17$ | | |
| $R_5=120.65$ | $d_5=4.35$ | $n_d=1.6968$ | $v_3=55.6$ |
| $R_6=45.65$ | $d_6=21.74$ | | |
| $R_7=896.74$ | $d_7=5.43$ | $n_d=1.74443$ | $v_4=49.4$ |
| $R_9=58.70$ | $d_9=58.15$ | $n_d=1.58065$ | $v_6=37.1$ |
| $R_{10}=-207.60$ | $d_{10}=0.54$ | | |
| $R_{11}=132.61$ | $d_{11}=12.5$ | $n_d=1.62004$ | $v_7=36.3$ |
| $R_{11''}=-65.2$ | $d_{11''}=4.35$ | $n_d=1.62041$ | $v_{7''}=60.3$ |
| $R_{11'}=\infty$ | $d_{11'}=9.78$ | | |
| $R_{12'}=\infty$ | $d_{12'}=8.15$ | $n_d=1.62004$ | $v_{7'}=36.3$ |
| $R_{12}=-86.14$ | $d_{12}=2.17$ | | |
| $R_{13}=-70.11$ | $d_{13}=3.80$ | $n_d=1.80518$ | $v_8=05.5$ |
| $R_{14}=98.26$ | $d_{14}=5.43$ | $n_d=1.62041$ | $v_9=38.0$ |
| $R_{15}=248.91$ | $d_{15}=3.80$ | | |
| $R_{16}=-288.04$ | $d_{16}=8.15$ | $n_d=1.5168$ | $v_{10}=64.2$ |
| $R_{17}=-72.28$ | $d_{17}=0.54$ | | |
| $R_{18}=-978.26$ | $d_{18}=11.41$ | $n_d=1.56384$ | $v_{11}=60.8$ |
| $R_{19}=-69.79$ | | | |

B.f=209.33 wherein $R_1$, $R_2$, $R_3$ . . . are the radii of the respective lenses, $d_1$, $d_2$, $d_3$ . . . are the lens thicknesses and air spaces between the respective lenses, $n_d$ the refractive indices of the respective lenses and $v_1$, $v_2$, $v_3$ . . . the Abbe numbers.

References Cited

FOREIGN PATENTS

| 978,797 | 12/1964 | Great Britain | 350—215 |
| 1,034,458 | 6/1966 | Great Britain | 350—215 |

JOHN K. CORBIN, Primary Examiner

U.S. Cl. X.R.

350—214